United States Patent [19]
Grounds

[11] Patent Number: 5,554,289
[45] Date of Patent: Sep. 10, 1996

[54] APPARATUS AND METHOD FOR INCREASING THE CAPACITY OF A WASTEWATER POND TREATMENT FACILITY

[76] Inventor: Harry C. Grounds, 477 S. Cretin Ave., St. Paul, Minn. 55105-1313

[21] Appl. No.: 166,220

[22] Filed: Dec. 13, 1993

[51] Int. Cl.$^6$ ................................................. C02F 3/12
[52] U.S. Cl. ..................... 210/607; 210/624; 210/626; 210/104; 210/195.3
[58] Field of Search ................................. 210/607, 614, 210/616, 623, 624, 626, 103, 104, 134, 143, 195.1, 195.3, 259, 170, 747

[56] References Cited

U.S. PATENT DOCUMENTS

| | | | |
|---|---|---|---|
| 2,071,591 | 2/1937 | Tholin | 210/616 |
| 3,733,264 | 5/1973 | Spector et al. | 210/195.3 |
| 4,070,292 | 1/1978 | Adams | 210/195.1 |
| 4,521,311 | 6/1985 | Fuchs et al. | 210/616 |
| 4,919,875 | 4/1990 | Copa et al. | 210/624 |
| 4,995,980 | 2/1991 | Jaubert | 210/607 |

FOREIGN PATENT DOCUMENTS 3637476  5/1988  Germany.

*Primary Examiner*—Christopher Upton
*Attorney, Agent, or Firm*—Moore & Hansen

[57] ABSTRACT

The present invention provides apparatus and method for increasing the wastewater treatment capacity of an existing pond treatment facility wherein the facility includes at least one treatment pond and means for bringing influent wastewater to the pond. Apparatus according to the present invention includes a porous baffle placed into the pond so as to separate the pond into two separate and distinct, but fluidly connected portions. The baffle thus divides the pond into a first portion for treatment of biological solids in the wastewater with the use of concentrated bacteriological growth and a second portion which provides a reservoir to accommodate high rates of wastewater flows and organic loads such as will occur with storm water flow.

16 Claims, 2 Drawing Sheets

APPARATUS AND METHOD FOR INCREASING THE CAPACITY OF A WASTEWATER POND TREATMENT FACILITY

FIELD OF THE INVENTION

The present invention relates generally to wastewater pond sewage treatment facilities and particularly to a method and an apparatus to convert existing wastewater pond treatment systems to accommodate a greater volume and flow of wastewater including storm water flows and to provide a high efficiency treatment.

BACKGROUND OF THE PRESENT INVENTION

Wastewater pond treatment systems are a well known method of treating wastewater produced by domestic and industrial sources. These systems have the advantages of the low cost of pond construction and minimum maintenance needs in comparison to other facilities used to treat wastewater. Pond treatment systems do have the disadvantages of requiting substantial amounts of land and, preferably, somewhat isolated areas for their use. Consequently, they have been favored in rural areas were land is less expensive and where the population is not as dense as is found in more urbanized areas.

These systems also have the disadvantage of being rather quickly outdated in terms of their capacity as the surrounding population grows. That is, existing pond treatment systems cannot, as a rule, be readily changed to accommodate population and industrial increases in the geographic area utilizing the system. As the population grows, more water is used that must be handled by the treatment system. In addition, new industry places further burdens on the treatment system since industry is typically a large source of wastewater that must be treated. An additional side effect of population growth is that the hard surfacing of the geographic area feeding into a wastewater treatment system increases, thereby decreasing the available am for rain water to be absorbed and increasing the storm sewer runoff. Ideally all storm water flows should be separated from the sanitary sewers. In actual practice some storm water flows will remain, thereby resulting in higher peak flows when combined with the sanitary sewers. A further problem faced by all sewage treatment facilities is the necessity of adapting to ever-changing government regulations concerning the level of treatment that must be provided. Seldom, if ever, do the regulations change to become less strict, thereby allowing the discharge of water having a reduced mount of treatment.

Solving the problem of increasing need for wastewater treatment capacity is seldom inexpensive or free of political ramifications and can involve costly, time-delaying litigation over the proposed solution. Expansion of those existing systems by construction of additional ponds is at times neither practical due to the surrounding terrain, the cost involved in the expansion—which may constitute only a short term solution to a long term anticipated population increase, and/or the local political opposition to the construction of additional ponds for treatment of the increased wastewater. The construction of entirely new facilities is also often neither financially or politically palatable. Existing wastewater pond treatment systems are thus often expected to perform beyond design specifications to the disadvantage of those downstream that must bear with the perhaps less than fully treated wastewater.

It would be desirable to have a method and apparatus for increasing the capacity of existing wastewater pond treatment systems that could do so without significant construction costs and that would enable the complete and ready treatment of excess storm sewer water as well as domestic and industrial wastewater.

SUMMARY OF THE INVENTION

It is an object of the present invention to provide new and improved apparatus that is not subject to the foregoing disadvantages.

It is another object of the present invention to provide apparatus that increases the capacity of existing wastewater pond treatment systems.

It is still another object of the present invention to provide apparatus that increases the capacity of existing wastewater pond treatment systems that does not require the construction of additional ponds.

It is yet another object of the present invention to provide a method of increasing the capacity of existing wastewater pond treatment systems.

It is still yet another object of the present invention to provide a method of increasing the capacity of existing wastewater pond treatment systems that did not require the construction of additional ponds.

The foregoing objects of the present invention are provided by apparatus and method for increasing the wastewater treatment capacity of an existing pond treatment facility wherein the facility includes at least one treatment pond and means for bringing influent wastewater to the pond. Apparatus according to the present invention includes a porous baffle placed into the pond so as to separate the pond into two separate and distinct, but fluidly connected portions. The baffle thus divides the pond into a fast portion for treatment of biological solids in the wastewater with the use of concentrated bacteriological growth and a second portion which provides a reservoir to accommodate high rates of wastewater flows and organic loads such as will occur with storm water flow. Stated otherwise, the porous baffle or perforated curtain retains in the pond first portion the concentrated solids brought into the pond by the wastewater. These solids are retained in the pond first portion for a rapid, concentrated treatment of those solids while providing for free hydraulic movement between the first and second portions based on hydraulic levels. The aforesaid means for bringing influent wastewater to the pond delivers the influent wastewater to the pond first portion. The apparatus may further have a biological solids separation unit to separate biological solids from the wastewater to produce a process effluent material and biological solids, means for fluidly connecting the pond first portion to the biological solids separation unit; means for transporting the process effluent material from the biological solids separation unit for further treatment elsewhere if desired; means for transporting the waste biological solids from the biological solids separation unit for further treatment as desired when the biological solids load reaches a predetermined limit; and return fluid conduit means for transporting the biological solids from the biological solids separation unit to the pond first portion for further treatment if desired. To take full advantage of the wastewater processing apparatus of the present invention, the present invention further contemplates the use of mixers and aerators in the first and second pond portions to encourage the rapid and maximum treatment of the wastewater.

Further in accordance with the present invention the apparatus may advantageously include a water level sensor for sensing the water level in the pond; a plurality of flow rate meters for measuring the flow rate of the influent wastewater into the pond, the flow rate of the process material from the biological solids separation unit, and the flow rate of the biological solids from the biological solids separation unit; an optical solids analyzer for analyzing the solids in the pond first portion; and a microprocessor that receives signals indicative of the water level in the pond from the meter sensing the water level in the pond; the flow rate of the influent wastewater from the meter measuring the flow rate of the influent wastewater; the flow rate of the process material from the meter measuring the flow rate of the process material; and the flow rate of the biological solids from the meter for measuring the flow rate of the biological solids. The microprocessor may also receive signals from the optical solids analyzer. The microprocessor can utilize these signal inputs to provide output control signals to a first pump that pumps wastewater from the pond first portion to the biological solids separation unit; a second pump that humps the waste biological solids from the biological solids separation unit; and a controller controlling a valve that controls the volume of biological solids returned to the pond first portion.

A method in accordance with the present invention provides for increasing the capacity of an existing wastewater pond treatment system, the system including at least one pond for treatment of wastewater, wherein the invention provides for separating the pond into a first portion for concentrated treatment of biological solids and a second portion and bringing influent wastewater to the pond first portion for treatment thereof. The method contemplates the disposition of a porous baffle in the pond as the step of division of the pond into two portions.

A method in accord with the present invention further contemplates aerating and mixing at least the pond first portion to provide for rapid and more efficient treatment of the wastewater in the pond first portion. The method further contemplates the pumping of wastewater from the pond first portion to a biological solids separation unit for separation of the biological solids from the wastewater in the biological solids separation unit and for the subsequent return of the separated biological solids to the pond first portion.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
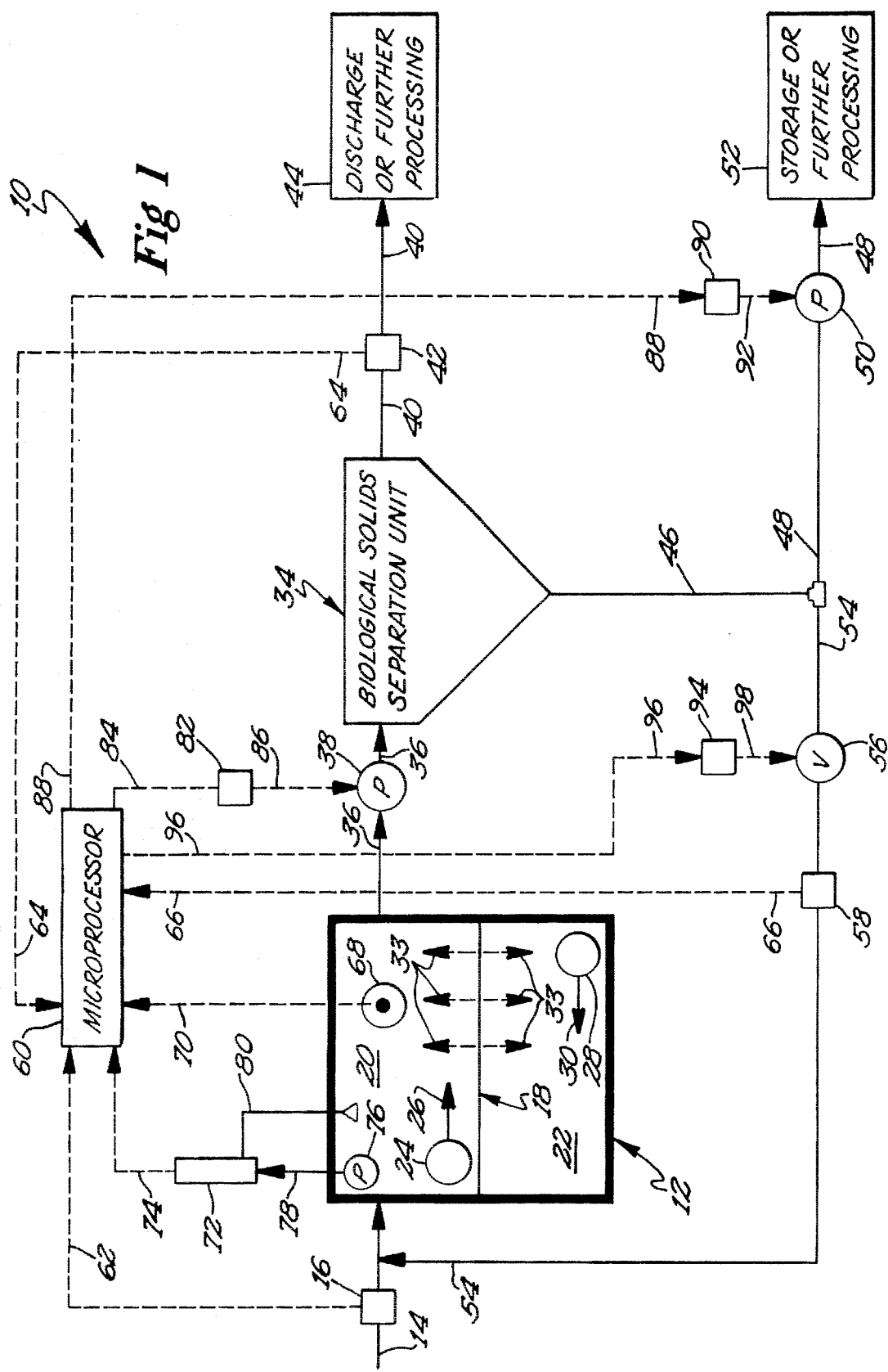
FIG. 1 is a schematic illustration of the present invention.

FIG. 1 shows in a schematic fore a wastewater pond treatment system in accord with the present invention. The system 10 will include an already existing pond 12 that is being used for the treatment of wastewater and the appropriate conduit, piping or other means 14 that brings the influent wastewater into the system 10. It will be understood that the influent wastewater will already have undergone some pretreatment in most circumstances, such as a coarse screening that removes solid material, both organic and inorganic. A flow meter 16 monitors the flow rate of the influent wastewater. The system 10 includes a porous baffle 18 that is disposed in the pond 12 so as to divide the pond 12 into a first and a second portion 20 and 22 respectively. A hydraulic interchange through the baffle 18 between the first and second portions 20 and 22 will be constantly occurring, therefore. The conduit 14 delivers the influent wastewater to the pond first portion 20. The first portion 20 is used to provide a concentrated treatment of the biological solids found in the influent wastewater. This treatment may include the use of aerators and or mixers 24 to stir the wastewater and provide the oxygen necessary for aerobic decomposition of the biological solids found in the influent wastewater, all as indicated by arrow 26. If desired, the second portion 22 of pond 12 may also include aerators and mixers 28 to provide stirring and oxygenation of the wastewater found in the second portion 22, as indicated by arrow 30.

Figure 2:
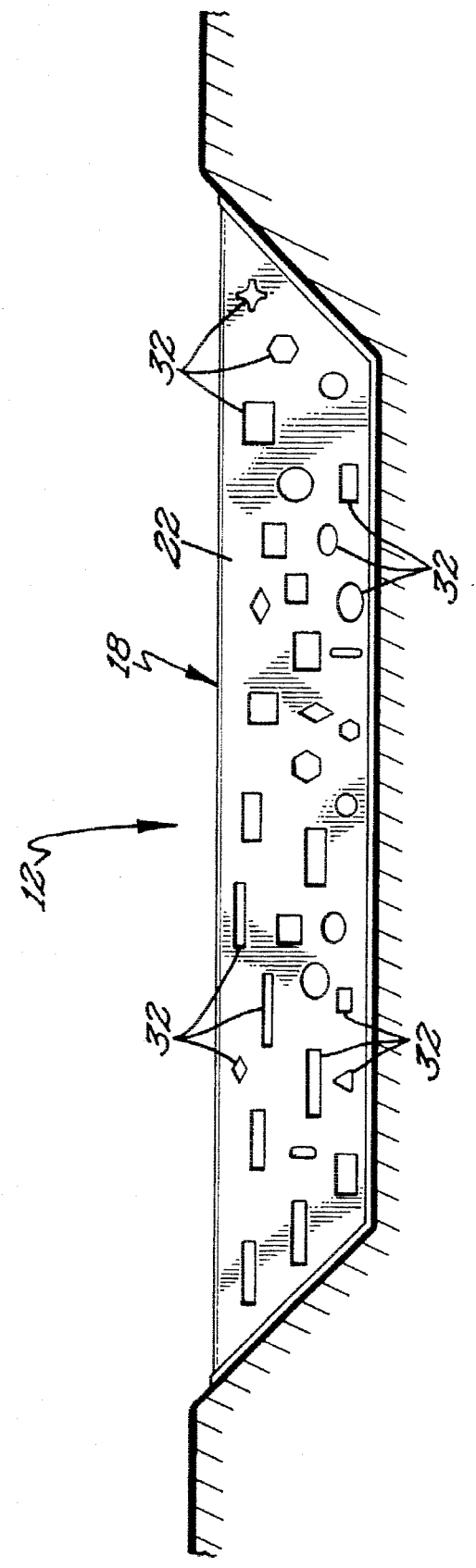
FIG. 2 is a side elevation schematic view of a porous baffle useful with the present invention in place in a pond.

Baffle 18, as previously mentioned, is porous and not solid. Referring to FIG. 2, it will be seen that baffle 18 comprises a substantially planar extent of material, such as structurally reinforced polyvinyl sheets, and has a plurality of pores 32 disposed therein to facilitate the interchange of water between the first and second portions 20 and 22 respectively. As shown, pores 32 may take on a variety of configurations, such as rectangular or circular, and may have other shapes as desired or as preferred to keep manufacturing costs reasonable. The pores should be numbered and sized to maintain avenge interchange fluid velocities less than 0.3 feet per second. Velocities larger than this can impose a too significant hydraulic head on the polyvinyl baffle and in addition higher velocities will carry more solids with the flow, thereby making it more difficult to control the concentrated solids portion of the pond. The presence of the pores will allow some movement of solids from the pond first portion 20 to the pond second portion 22, where they will undergo long term storage and treatment. The pores 18 will also generally permit a fluid interchange between the pond portions 20, 22, as indicated by double-headed arrows 33. Baffle 18 may, if desired, be mounted for movement such that the relative sizes of the fast and second pond portions 20 and 22 may be changed as desired or as needed.

The use of the baffle 18 to divide the pond 12 into two portions allows the existing pond infrastructure to be used for full biological treatment and processing of an increasing amount of influent wastewater while enabling the use of the pond 12 as a storage reservoir. The reservoir provides a means for alleviating both peak flows and peak organic loads as a kind of processing flywheel effect. The porous nature of the baffle 18 further acts to reduce and minimize the effect of storm water influxes into the wastewater treatment system. That is, the baffle 18, while retaining a substantial portion of the biological solids within the first portion 20 for full biological treatment thereof, allows excess water associated with the storm sewer influx to flow through the pores 32 in the baffle 18 into the pond second portion 22. Stated again, the porous baffle 18 provides for a slow solids movement therethrough and keeps the second portion 22 of the pond 12 in an aerobic condition. The pond first portion 20, meanwhile, i. converted into a very highly efficient activated sludge treatment site, activated sludge treatment being a well known process in the art that consequently will not be discussed further herein. In this manner, the present invention provides for the long term treatment of contaminated storm water flows in the pond second portion 22 and reduces the need for the prior art separation of the storm water sewer from the sanitary sewer where ponds are used for treatment of the wastewater. It will be understood that them is a continuous interchange through the baffle of the fluids and their entrained solids. Left alone, eventually an equilibrium would be obtained between the two portions. However, the continuous influx of untreated wastewater into first portion 20 result in the first portion always having a higher concentration of biological solids (which can then be treated with known processes) than the second portion 22.

The present invention further contemplates the inclusion of a biological solids separation unit 34 consisting of a clarifier, filter, or a combination of the two. Such units are well known to the art and operate to enhance the treatment process by concentrating the solids for return or wasting and by clarifying the liquid portion for discharge or further processing. Wastewater from pond first portion 20 is pumped to unit 34 through appropriate pipe, conduit or other means 36 by a pump 38. Within unit 34 the wastewater is subjected to further treatment and processing so as to produce a processed clarified, liquid effluent and biological solids. The processed effluent for example, is discharged from unit 34 and from the system 10 through appropriate pipe, conduit, or other means 40. A flow meter 42 may be used to monitor the flow rate of the processed material. The processed material may be either discharged or subjected to further treatment as indicated by box 44.

The biological solids are discharged from unit 34 through an appropriate discharge pipe, conduit, or other means 46. The biological solids, which include microorganisms, organic solids, and inorganic solids, for example, are returned to the pond 12, and specifically the pond first portion 20 via an appropriate pipe, conduit, or other means 54 through a control valve 56. The return flow of biological solids to the pond first portion 20 can be monitored by a flow meter 58. The returned biological solids are therefore subject to further processing in accord with the present invention. When the load of biological solids gets too large, the biological solids will be wasted and hence are known as waste biological solids. The waste biological solids are discharged from the system via an appropriate pipe, conduit or other means 48 by means of a discharge pump 50. The waste biological solids may be stored or subjected to further processing or treatment for environmental recycling as indicated at 52.

The present invention further contemplates a control system for controlling the pond water level and the various pumps previously mentioned. Thus, the present invention may also include a controller such as a microprocessor or other computer type of device 60. Microprocessor 60 receives input signals from influent wastewater flow meter 16 over an appropriate data connection 62, from processed material flow meter 42 over an appropriate data connection 64, from biological solids flow meter 58 over an appropriate data connection 66, from a water level sensor 68 disposed in pond first portion 20 over an appropriate data connection 70, and from an optical solids analyzer 72 over an appropriate data connection 74.

Optical solids analyzer 72 includes a pump 76 for pumping a wastewater sample from pond first portion 20 to analyzer 72 over a pipe, conduit, or other means 78 and a return line 80 for returning the sample to the pond first portion 20. Optical solids analyzer 72 will analyze the wastewater sample for suspended solids concentration. Typically, this type of device operates by measuring the turbidity of the wastewater sample. The results of the analyzer 72 provide an indication of the biological solids concentration in pond first portion 20 and the need for wasting solids from the system.

Microprocessor 60 in turn will provide appropriate output signals to a variable speed drive 82 over an appropriate data connection 84. Variable speed drive 82 will control via a control line 86 the pumping speed of pump 38 and thus the volume of wastewater being pumped from pond first portion 20 to the biological solids separation unit 34. The output signals to variable speed drive 82 may be a function of the input signals received by microprocessor 60 from influent wastewater flow meter 16, return biological solids flow meter 58, processed material flow meter 42, and water level sensor 68. Microprocessor 60 will signal variable speed drive 82 to increase the pumping provided by pump 38 when the liquid level in pond first portion 20 increases above a set limit. Microprocessor 60 will signal variable speed drive 82 to decrease the pumping provided by pump 38 when the liquid level in pond first portion 20 decreases beyond a set limit.

Microprocessor 60 will also provide an output signal via a data line 88 to a variable speed drive 90 that is in turn connected to waste biological solids pump 50 via a control line 92. In this manner microprocessor 60 can control the pumping speed and thus the volume of waste biological solids pumped from the system 10 by pump 50. The output signal to variable speed drive 90 may be based upon the input signals received by microprocessor 60 from the optical solids analyzer 72. Microprocessor 60 will signal variable speed drive 90 to increase the pumping provided by pump 50 when analyzer 72 provides a signal indicating the suspended solids concentration has risen above a desired or predetermined level. Microprocessor 60 will signal variable speed drive 90 to decrease the pumping provided by pump 50 when analyzer 72 provides a signal indicating the suspended solids concentration is less than the desired or predetermined level.

Microprocessor 60 will also provide an output signal to a valve controller 94 over a data line 96. Valve controller 94 will in turn control the operation of control valve 56 via a control line 98. The output signal from microprocessor 60 to valve controller 94 will be an appropriate function of the signal received thereby from the process material flow meter 42. Microprocessor 60 will signal the valve controller 94 to increase the flow of biological solids through the control valve 56 when the signal from process material flow meter 42 indicates that the processed effluent flow rate has increased and will provide a signal to decrease the flow when the signal from flow meter 42 indicates that the processed effluent flow rate has decreased.

It will be understood that the actual operation of microprocessor 60 and the associated control apparatus for system 10 will be dependent upon a number of factors, including the type of microprocessor actually used; the type of pumps and associated variable speed drives associated therewith that are used; the type of optical solids analyzer used; the type of control valve and controller associated therewith that is used; and the various physical dimensions of the system 10. These latter factors include the capacity of the pond 12, the relative sizes of the pond first and second portions 20 and 22, respectively, the sizes and capacities of the piping utilized in system 10, the size of the pores in baffle 18, the flow rate of wastewater into the system, and other factors known to the art. Thus, the functioning of the control system for the present invention 10 will be dependent upon the actual installation where the present invention is utilized and cannot be specified further accordingly. The design and operation of such a control system as hereinbefore described for a particular wastewater treatment facility is, however, within the skill of those engaged in this art.

A feature of the present invention 10 and the porous baffle 18 is the provision of a location for the high rate treatment of the biological solids found in the influent wastewater and a separate location for a lower rate of treatment to stabilize the biological solids found in the influent wastewater that are undergoing longer term storage in the pond second portion, all within the existing infrastructure of a wastewater pond treatment system. The use of a portion of a pond for treatment of the wastewater by means of concentrated bacteriological growth will increase the efficiency of the treatment system and will lower the overall cost of treatment by use of the existing infrastructure. Conversion of an existing pond treatment facility in accord with the present invention will obviate the need that many communities presently feel to abandon their present treatment facility in favor of an often very expensive, newly constructed wastewater treatment facility. The baffle 18 allows for a hydraulic overload of the existing system. This enables the system to treat all or a substantial portion of the storm water received thereby, consequently reducing the cost of storm water treatment and/or separation.

The present invention having thus been described, other modifications, alterations, or substitutions may now suggest themselves to those skilled in the art, all of which are within the spirit and scope of the present invention. For example, it will be understood that an existing treatment facility may have more than one pond, with the several ponds thereof being fluidly connected in a known manner for the treatment of the wastewater. Additionally, it will be understood that the representation of pond 12 and baffle 18 in FIG. 1 are illustrative only and that the pond 12 may have other than the rectangular configuration shown. The present invention can accommodate such existing systems by use of a baffle in one or more ponds in the manner heretofore described. It is therefore intended that the present invention be limited only by the scope of the attached claims below.

What is claimed is:

1. In combination with a wastewater pond treatment facility including at least one pond for treatment of wastewater and means for bringing influent wastewater to said pond, an apparatus for increasing the wastewater treatment capacity of said pond, said apparatus comprising:

a porous baffle disposed in said pond and separating said pond into a first portion and a second portion, said first portion to be used for concentrated treatment of biological solids said means for bringing influent wastewater to said pond bringing the influent wastewater to said pond first portion;

means for separating biological solids from the wastewater to produce a process material and biological solids;

means for fluidically connecting said pond first portion to said means for separating biological solids;

means for transporting the process material from said means for separating biological solids; and return means for transporting the biological solids from said means for separating biological solids to said pond first portion.

2. The apparatus of claim 1 and further including:

said first and second pond portions each including means for mixing and aerating the wastewater in said portions.

3. The apparatus of claim 1 and further including:

means for sensing the water level in said pond;

means for measuring the flow rate of the influent wastewater;

means for measuring the flow rate of the process material;

means for measuring the flow rate of the biological solids;

means for analyzing the solids in said pond first portion; and a microprocessor, said microprocessor receiving signals indicative of:

the water level in said pond from said means for sensing the water level in said pond;

the flow rate of the influent wastewater from said means for measuring the flow rate of the influent wastewater;

the flow rate of the process material from said means for measuring the flow rate of the process material; and the flow rate of the biological solids from said means for measuring the flow rate of the biological solids;

the solids in said pond first portion from said means for analyzing the solids in said pond first portion, wherein said microprocessor provides output signals indicative of said received signals.

4. The apparatus of claim 3 and further including:

a first pump for pumping wastewater from said pond first portion to said means for treating biological solids.

5. The apparatus of claim 4 wherein said microprocessor controls the volume of wastewater pumped by said first pump based upon said signals received from said means for measuring the flow rate of the influent wastewater, said means for measuring the flow rate of the biological solids, said means for sensing the water level in said pond, and said means for measuring the flow rate of the process material.

6. The apparatus of claim 4 and further including:

a second pump for pumping waste biological solids from said means for separating biological solids when the volume of biological solids reaches a predetermined level.

7. The apparatus of claim 6 wherein said microprocessor controls the volume of waste biological solids pumped by said second pump based upon said signals received from said means for analyzing the solids in said pond first portion.

8. The apparatus of claim 3 and further including:

a pump for pumping waste biological solids from said means for separating biological solids.

9. The apparatus of claim 8 wherein said microprocessor controls the volume of waste biological solids pumped by said second pump based upon said signals received from said means for analyzing the solids in said pond first portion.

10. The apparatus of claim 3 wherein said means for analyzing the solids in said pond first portion includes:

an optical solids analyzer;

means for pumping wastewater from said pond first portion to said analyzer; and means for returning analyzed wastewater from said analyzer to said first pond portion.

11. The apparatus of claim 1 and further including:

means for measuring the flow rate of the process material;

means for measuring the flow rate of the biological solids;

a microprocessor, said microprocessor receiving signals indicative of:

the flow rate of the process material from said means for measuring the flow rate of the process material; and the flow rate of the biological solids from said means for measuring the flow rate of the biological solids;

wherein said microprocessor provides output signals indicative of said received signals.

12. The apparatus of claim 11 and further including:

a valve, said valve for controlling the volume of biological solids returned to said pond first portion.

13. The apparatus of claim 12 and further including:

means for controlling said valve, said means for controlling operating in response to signals received from said microprocessor in response to said signals indicative of the flow rate of the process material from said means for measuring the flow rate of the process material and the flow rate of the biological solids from said means for measuring the flow rate of the biological solids.

14. The apparatus of claim 1 wherein said baffle has a plurality of pores that allow the interchange of fluids between said pond first and second portions.

15. The apparatus of claim 14 wherein said pores are sized and in such sufficient number so as to keep the interchange fluid velocity less than or equal to 0.3 feet per second.

16. A method for increasing the capacity of an existing wastewater pond treatment system, the system including at least one pond for treatment of wastewater, said method including:

separating the pond into a first portion and a second portion, said first portion to be used for concentrated treatment of biological solids;

bringing influent wastewater to said pond first portion for treatment thereof;

pumping wastewater from said pond first portion to a biological solids separation unit;

separating biological solids from the wastewater in said biological solids separation unit; and returning the separated biological solids to said pond first portion.

* * * * *